J. A. BOWDEN.
STEERING WHEEL LOCKING MEANS FOR AUTOMOBILES.
APPLICATION FILED AUG. 7, 1916.

1,224,440.

Patented May 1, 1917.

INVENTOR.
Junius A. Bowden

UNITED STATES PATENT OFFICE.

JUNIUS A. BOWDEN, OF LOS ANGELES, CALIFORNIA.

STEERING-WHEEL-LOCKING MEANS FOR AUTOMOBILES.

1,224,440.   Specification of Letters Patent.   Patented May 1, 1917.

Application filed August 7, 1916. Serial No. 113,625.

*To all whom it may concern:*

Be it known that I, JUNIUS A. BOWDEN, a citizen of the United States, residing at Los Angeles, in the county of Los Angeles, State of California, have invented new and useful Improvements in Steering-Wheel-Locking Means for Automobiles, of which the following is a specification.

This invention relates to means adapted for locking a steering wheel of an automobile, the object being to prevent guiding and running the automobile by any unauthorized person. It is intended to provide inexpensive parts that may be easily and securely attached to the steering wheel and the housing of the steering mechanism of most all makes of automobiles whereby the steering wheel and housing may be united by the parts and locked together.

Figure 1:
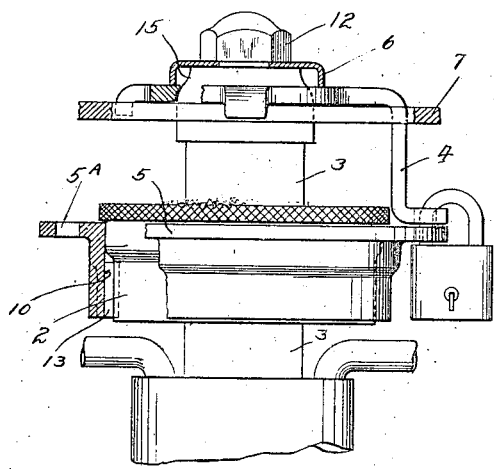
Figure 2:
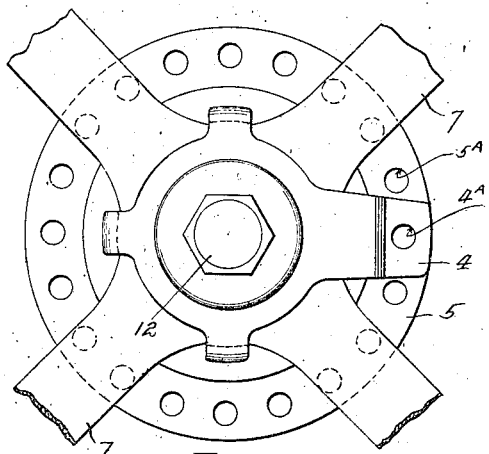
Figure 3:
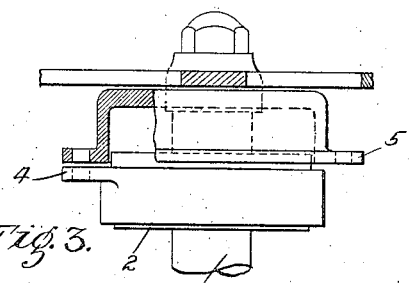
Figure 4:
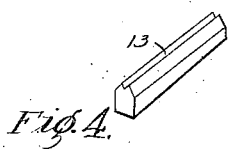

Referring to the drawings: Figure 1 shows a partial sectional view and a partial elevation of the steering wheel and gear case 2, and the steering rod housing 3. Fig. 2 shows a plan view of the arm 4 and perforated flange of collar 5. Fig. 3 shows another form where the arm is attached to gear case 2 (shown in Fig. 1) and flange collar 5 attached to the hub of the steering wheel. Fig. 4 shows a key of special construction which is employed to key collar 5 to gear case 2.

Referring more specifically to the drawings and for a better explanation of the invention, the arm 4 shown in Fig. 2 is enlarged at one end and provided at that end with an opening adapted to fit over the end of hub 15 of the steering wheel and when assembled the cupped washer 6 shown in Fig. 1 is placed as shown and holds the arm securely by means of nut 12. The arm has a perforation near one end and by turning the steering wheel when the arm is attached to the hub, the arm is moved in a circle and the perforation 4<sup>A</sup> is adapted to register with any one of the perforations 5<sup>A</sup> in the flange of collar 5. The perforated flange of collar 5 is provided with an inner key seat 10 (see Fig. 1) and is keyed to gear case 2 by key 13, or may be secured in any other suitable manner to prevent movement. The flange of this collar is provided with numerous perforations as shown in Fig. 2. Whenever it is desired to lock the steering wheel in whatever position the steering wheel may be left when the automobile comes to a stop, it will only require the slightest movement of the wheel to register the perforation in the arm with any one of the numerous perforations in the flange of collar 5 and should it be desirable to shift the front wheels in any particular direction before leaving the automobile, it is only necessary to slightly move the steering wheel as explained above.

My invention is intended to provide two essential elements, one to be secured upon the gear case, and the other to be secured to the hub of steering wheel, one to have a single perforation and the other may have one or more perforations, the perforation in each element adapted to be brought into registration with each other and united by the engagement of a suitable lock.

What I claim is—

1. Means for locking the steering wheel of an automobile in combination with the steering wheel and gear case near the hub of the steering wheel, comprising a collar having a flange and a perforation in said flange as one element, an arm having a perforation in its outer extension as a second element, one of said elements adapted to be secured to the hub of the steering wheel and the other element adapted to be secured to the housing of the steering gears, said perforation in the arm and said perforation in the flange adapted to register with each other whereby the arm and flange may be secured together by means of a lock.

2. Means for locking the steering wheel of an automobile in combination with the steering wheel and gear case near the hub of the steering wheel, comprising a collar having a flange and a perforation in said flange, an arm, said arm having an enlarged end, an opening in said end, said opening adapted to register with and engage the hub of said wheel, means adapted to rigidly secure said end to said hub adapted to prevent rotation and displacement of the arm, means for securing said collar to said housing, a perforation in the smaller end of said arm, the perforation in said flange and the perforation in said arm adapted to register with each other whereby the arm and flange may be secured together by means of a lock.

3. Means for locking the steering wheel of an automobile in combination with the steering wheel and gear case near the hub of the steering wheel, comprising a collar having a flange and a perforation in said flange, an arm, said arm having an enlarged end and opening in said end, said opening adapted to register with and engage the hub of said wheel, means adapted to rigidly secure said end to said hub, said means comprising projecting members on said enlarged end adapted to extend between the spokes of said wheel and engage the base of the spokes adapted to prevent rotation and displacement of the arm, means for securing said collar to said housing, a perforation in the smaller end of said arm, the perforation in said flange and the perforation in said arm adapted to register with each other whereby the arm and flange may be secured together by means of a lock.

In testimony whereof I have hereunto set my hand, at Oakland, California, this 2nd day of August, 1916.

JUNIUS A. BOWDEN.